Aug. 30, 1932.  T. W. MUELLER  1,875,107

PARCEL CARRIER FOR BABY CARRIAGES

Filed Jan. 27, 1930

Inventor.
Theophil W. Mueller.
by Burton & Burton
his Attorneys

Patented Aug. 30, 1932

1,875,107

UNITED STATES PATENT OFFICE

THEOPHIL W. MUELLER, OF ELMHURST, ILLINOIS

PARCEL CARRIER FOR BABY CARRIAGES

Application filed January 27, 1930. Serial No. 423,608.

The purpose of this invention is to provide an improved parcel carrier of the sort designed to be separably attached to the propelling handle member of a baby carriage and the like to permit the person propelling the carriage to transport at the same time market purchases or other material of limited bulk, without embarrassment in propelling the carriage or the necessity of appropriating any portion of the carriage space for the parcels.

It consists in the elements and features of construction shown and described as indicated in the claims.

In the drawing:—

Figure 1:
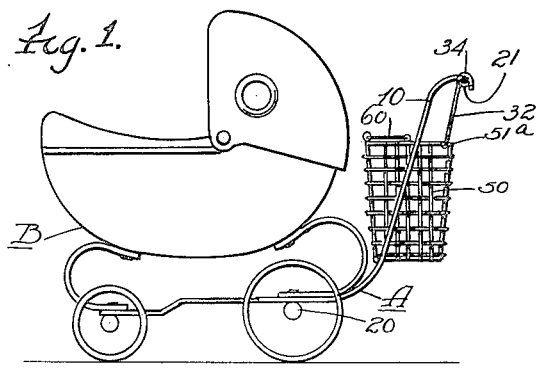
Figure 1 is a side elevation of a baby carriage equipped with a device embodying this invention.
Figure 2:
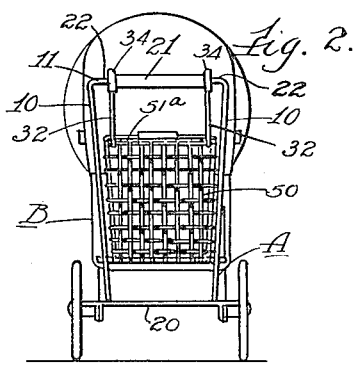
Figure 2 is a rear end elevation of the same.
Figure 3:
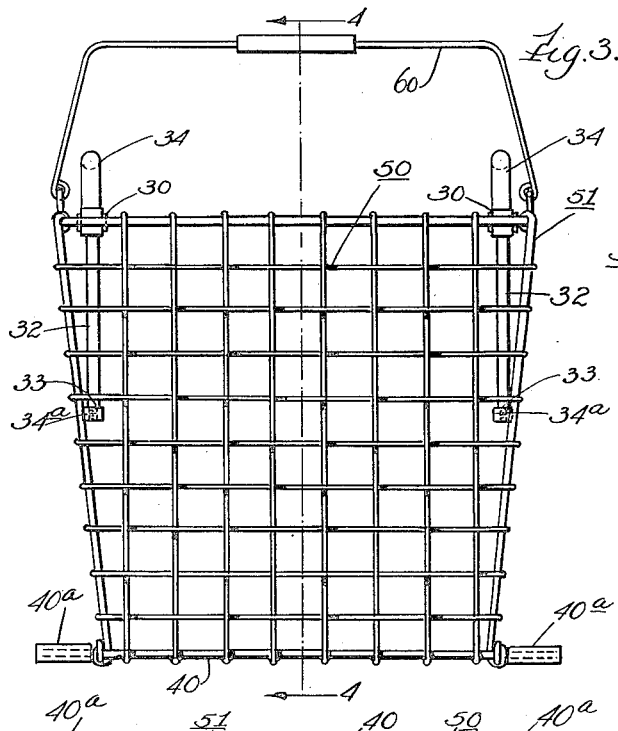
Figure 3 is a rear elevation of the parcel carrier adapted for mounting on the carriage.
Figure 4:
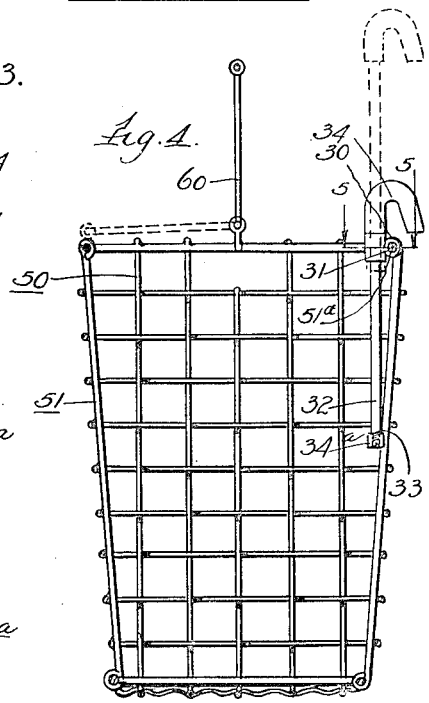
Figure 4 is a side elevation of the same.

Referring to the drawing in detail:

The carriage frame structure is indicated as to its entirety by reference letter, A. The carriage body is indicated by reference letter B. The propelling means, shown as a rear handle for pushing the carriage, and, as seen, comprising fore-and-aft up-and-down-extending side bars, 10, and cross bar 11, the latter shown as customarily constructed integral with the side bars, which latter are attached at their ends to the rear axle, 20, of the carriage frame structure, the handle cross bar, 11, being shown provided with a hand grasp member or ferrule, 21, occupying an extended middle part of the length of said cross bar, and having limited exposed portions, 22, 22, at the opposite ends of said hand grasp member, affording means for engaging with the carriage propelling handle the parcel carrier which will be now described.

This parcel carrier comprises a container, 50, which, as shown, and desirably, is a woven wire construction woven about a skeleton frame indicated as to its entirety at 51, said container being in general rectangular in both horizontal and vertical dimensions, and open at the top to the full extent of its horizontal dimensions which are such as to adapt it to be entered downwardly between the side bars, 10, 10, of the propelling handle member and between the handle cross bar, 11, and the carriage body. At the upper rear corners of the container there are provided, pivoted to the top rod, 51$^a$, of the skeleton, 51, of the container short links, 30, 30, said links having each at the free end an eye, 31, transverse of the rod, 51$^a$, on which the links are pivoted. Members 32, 32, are suspending rods which are passed through the eyes, 31, of the links, 30, 30, respectively, each having the lower end furnished with a stop, 33, which may be formed by upsetting the ends of the rods or applying thereto cap nuts, 34$^a$. At their upper ends the suspending rods, 32, are formed each with a downwardly open hook, 34, dimensioned for engaging the cross bar, 11, at the limited spaces, 22, 22, at the ends of the horizontal hand grasp member, 21, immediately inside the side bars, 10.

At the lower forward transverse corner or edge of the container in the form shown in the principal figures, there is rigid with the container a rod, 40, which may be, as shown, a part of the skeleton, 51, which projects at its opposite ends beyond the sides of the container a sufficient distance to project across the handle member side bars, 10, 10, to form by its projecting ends stops, 40$^a$, 40$^a$, which are stopped on said side bars.

In addition to the suspending rods and bottom stop rod above described the container is provided with a bail, 60, pivoted to the upper end of the container about midway in the fore-and-aft dimension thereof, and formed and dimensioned for folding down on the upper edge of the container as the forward side and at said folded down position coinciding substantially with the horizontal outline of the entrance mouth of the container, and not substantially obstructing that entrance mouth.

Upon considering the structure as described it will be understood that the parcel carrier as a unit separate from the carriage, is adapted to be carried by the bail handle, and so may be used independently as a market basket for accumulating therein the daily purchases of the housewife, and that, either empty or filled, it is readily mounted on the propelling handle member of the baby carriage by withdrawing the suspending rods, which, it may be noticed, normally by gravity when the container is being carried by the bail, extend down in the rear corners of the container,—and introducing the container downwardly between the handle member side bars, engaging the hook ends of the suspending rods with the cross bar, the stops, 33, following down along the side bars in front of the latter to a position at which the container is held suspended by the suspending rods hooked onto the cross bar, 11; and that when the container is thus positioned the bail will be folded down to the margin of the container mouth, leaving the latter unobstructed for introducing or removing parcels.

Figures 6, 7:
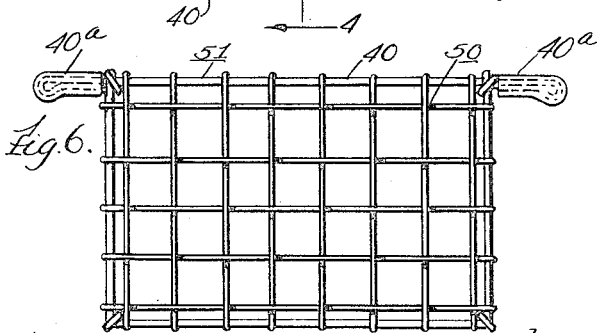
Figure 6 is a bottom plan view of the parcel carrier without the suspending rods and carrying bail.
Figure 7 is a detail plan of a fragment of the parcel carrier with a modified form of lower end stop.
Figures 5, 8:
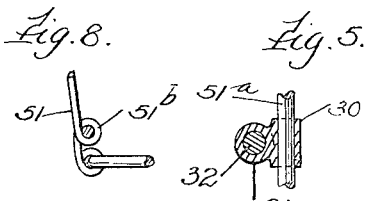
Figure 5 is a detail section at the line 5—5 on Figure 4.
Figure 8 is a detail section at the line 8—8 on Figure 7.

In Figures 7 and 8 there is illustrated a modified form of the bottom front stop device for lodging against the handle side bars. This modification, which may be preferred only for adapting the device for use interchangeably on a carriage having the handle side bars considerably more widely spread than the width of the container and on one having the said side bars only slightly wider apart than necessary to admit the container between them. In this form the stop device comprises two rods or wires, 62, 62, interlocked by the eyes, 63, formed at their inner ends for sliding longitudinally of each other in a manner which may be called telescoping with each other, to vary the length of the unit which they thus constitute, and thereby vary the distance to which their opposite ends protrude laterally from the container, as necessary to engage differently spaced side bars and not protrude excessively beyond them in the case of the more narrowly spaced side bars.

When this form of stop device is employed, mounting and guidance for the rod, 62, is afforded by forming the side rods of the skeleton, 51, with eyes, 51ᵇ, in which the rods, 62, slide, as seen in Figures 7 and 8; and to limit the extension of this stop device the bottom horizontal cross rod of the skeleton, 51, is furnished with a fixed abutment, seen at 51ᵃ, Figure 7, midway in the length of said cross rod, against opposite sides of which the eyes, 63, of the interlocked rod, 62, are stopped at the limit of extension of this stop device.

I claim:

1. For use with a baby carriage and the like having handle side bars extending in up-and-down and fore-and-aft direction joined at their upper ends by a cross bar and operatively joined at their lower ends to the carriage frame, a parcel carrier comprising an upwardly open container dimensioned for being introduced downwardly between the handle side bars and between the connecting cross bar and the carriage body; suspending rods attached to the container at the laterally opposite upper corners of the side toward the handle cross bar having their upper ends furnished with downwardly open hooks for engaging the handle cross bar, the container having at its lower end at the side opposite that having the suspending rods outwardly projecting stops for lodging against the side bars respectively when the container is suspended from the handle cross bar by said suspending rods.

2. In the construction defined in claim 1, eyes for engaging the suspending rods with the container, said eyes being mounted at the laterally opposite upper corners of the container, and the suspending rods being engaged slidably with said eyes respectively for being thrust downward in the container when the latter is not in service on the carriage.

3. In the construction defined in claim 1, the suspending means being engaged with the container in a manner permitting said means to be depressed into the container when the latter is not in service on the carriage, and the container having a bail for carrying it apart from the carriage, said bail being dimensioned for folding down on the top of the container and out of container-entrance-obstructing position when the container is in service on the carriage.

4. In the construction defined in claim 1, the bottom corner stops of the container being provided by a member consisting of a pair of rods interlocked for sliding along each other to extend and contract the member, to cause the ends of said rods constituting the stops respectively to protrude more or less beyond opposite bottom corners of the container.

5. In the construction defined in claim 1, means for attaching the suspending rods to the container consisting of short links pivoted at one end on the container for rendering the container free for pivotal movement in fore-and-aft direction independently of the hook engagement with the handle cross bar and having at the other ends eyes with which the suspending rods are adapted to engage slidingly; whereby said suspending rods may be thrust down in the container when the latter is out of service.

6. For use with a baby carriage and the like having handle side bars extending in upand-down and fore-and-aft direction and joined at their upper ends by a cross bar and operatively joined at their lower ends to the carriage frame, a parcel carrier comprising an upwardly open container having a rigid frame dimensioned for being introduced downwardly between the handle side bars and between the connecting cross bar and the carriage body, a pair of suspensors attached to the container at corresponding points in the opposite sides of the open upper end of the container proximate the rear corners, said suspensors having their upper ends furnished with disengageable means for engaging the handle cross bar, the container frame having at its lower end at the forward side, outwardly projecting stops and dimensioned with respect to the up-and-down and fore-and-aft slope of the handle bars to locate the front corner of the frame and said stops normally behind the handle side bars respectively when the container is suspended from the handle cross bar by said suspensors.

7. The construction defined in claim 6, the bottom corner stops of the container being adjustable longitudinally for varying the extent to which they protrude laterally from the container.

In testimony whereof, I have hereunto set my hand at Elmhurst, Illinois, this 23rd day of January, 1930.

THEOPHIL W. MUELLER.